US011675862B1

(12) United States Patent
Brody et al.

(10) Patent No.: US 11,675,862 B1
(45) Date of Patent: *Jun. 13, 2023

(54) ONLINE ACTIVITY IDENTIFICATION USING ARTIFICIAL INTELLIGENCE

(71) Applicant: FOUNDRYDC, LLC, Washington, DC (US)

(72) Inventors: Ned Brody, Washington, DC (US); James Manzi, Washington, DC (US)

(73) Assignee: FOUNDRYDC, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,594

(22) Filed: Dec. 23, 2021

Related U.S. Application Data

(63) Continuation of application No. 16/732,886, filed on Jan. 2, 2020, now Pat. No. 11,238,125.

(60) Provisional application No. 62/787,679, filed on Jan. 2, 2019.

(51) Int. Cl.
G06F 16/953 (2019.01)
G06F 16/9538 (2019.01)
G06F 16/958 (2019.01)
G06N 3/049 (2023.01)
G06F 16/955 (2019.01)

(52) U.S. Cl.
CPC ........ *G06F 16/9538* (2019.01); *G06F 16/958* (2019.01); *G06F 16/9558* (2019.01); *G06N 3/049* (2013.01)

(58) Field of Classification Search
CPC .......................... G06F 16/9038; G06F 16/904
See application file for complete search history.

(56) References Cited

U.S. PATENT DOCUMENTS

| 7,689,531 | B1 | 3/2010 | Diao et al. |
| 7,711,673 | B1 | 5/2010 | Diao |
| 8,233,726 | B1 | 7/2012 | Popat et al. |
| 8,706,742 | B1* | 4/2014 | Ravid ............... G06N 5/04 707/740 |
| 9,910,847 | B2 | 3/2018 | Bittmann |
| 2006/0047441 | A1 | 3/2006 | Homayouni et al. |
| 2011/0213736 | A1 | 9/2011 | Diao et al. |
| 2019/0362002 | A1* | 11/2019 | Dowling ............. G06F 40/18 |
| 2020/0176089 | A1* | 6/2020 | Jones ............... G16H 10/20 |

* cited by examiner

Primary Examiner — Baoquoc N To
(74) Attorney, Agent, or Firm — Foley & Lardner LLP

(57) ABSTRACT

Disclosed herein are embodiments of systems, methods, and products comprises a server, which provides trigger-based personalized sales outreach based on a user's request. The request comprises a list of target companies/people. The server scans a variety of sources by web crawling the sources' web documents and finds news items relevant to the target companies/people. The server determines an importance score for each news item that measures the probability of a sales representative being interested in the news item. The server applies a set of filters comprising a network of neural networks to filter out false positives. The analytic server determines a relevancy score for each news item. The server generates a GUI to display the news items satisfying certain thresholds. Based on the user's selection on the news items, the server uses the news items as triggers of outreach and generates an electronic message template prepopulated with the news items.

20 Claims, 10 Drawing Sheets

ONLINE ACTIVITY IDENTIFICATION USING ARTIFICIAL INTELLIGENCE

CROSS-REFERENCE TO RELATED APPLICATIONS

This application is a continuation of U.S. patent application Ser. No. 16/732,886, filed Jan. 2, 2020, which claims priority to U.S. Provisional Patent Application Ser. No. 62/787,679, filed Jan. 2, 2019, each of which is fully incorporated herein by reference in its entirety for all purposes.

TECHNICAL FIELD

This application relates generally to methods and systems for generating, implementing, and executing artificial intelligence models for identifying web activities.

BACKGROUND

Sales outreach is challenging. Traditional methods may try to outreach potential buyers by sending emails or making phone calls to countless people. However, such traditional methods may be insufficient and time consuming. While a large number of people may have been outreached, the receivers of the emails or phone calls may be random people who are not interested in the provided goods/services. In other words, the traditional methods may have a low success rate because most of the emails and phone calls may not lead to a purchase of the goods/services.

Furthermore, the traditional methods may only include general information that appears the same to a large number of different people. The traditional methods may not perform research on the background, needs, and other relative information of a potential user, and may not be able to provide designated information for a particular potential buyer in sale outreach. In addition, the traditional methods may not be able to outreach the right potential buyers at the right time. For example, the buyers' needs and interests may be changing. The traditional methods may not be able to identify the buyer's interests and the changes of the interests and may miss the opportunity of launching the sales outreach at the right time.

SUMMARY

For the aforementioned reasons, there is a need for a more efficient and accurate system and method that would minimize the time and effort required for sales outreach. Disclosed herein are systems and methods for increasing the quantity and quality of personalized sales outreach by embedding a daily efficient, trigger-based sales outreach on top of a sales funnel. Disclosed herein are systems and methods that allow outreach to potential customers based on a trigger mechanism and perform deep research on the potential customers for personalized outreach. In addition, the embodiments disclosed herein may minimize the time and effort required for outreach by setting up a pre-configured outbound email.

More specifically, disclosed herein are systems and methods for receiving a request comprising a list of target companies/people from a salesperson, scanning a variety of sources to find news items relevant to the target companies/people, determining an importance score for each news items that measures the probability of a general salesperson being interested in the news item, determining a relevance score for each new items that measures the level of relevance between the news item and a target company/person, generating a graphical user interface to display the news items satisfying certain threshold, and generating electronic message templates to reach out target companies/people using the news items as triggers.

In one embodiment, a method comprises retrieving, by a server, a set of web documents in response to a plurality of search attributes inputted by a first user while interacting with a graphical user interface, the plurality of search attributes comprising at least an attribute associated with a second user; extracting, by the server, a set of terms from each web document; generating, by the server, a set of vectors representing an n-gram value corresponding to each term within the set of terms; executing, by the server, a first artificial intelligence model comprising a multi-layer neural network, the first artificial intelligence model being configured to receive the set of vectors for each web document and to generate an importance value associated with each web document; executing, by the server, a second artificial intelligence model configured to receive a first subset of the set of vectors corresponding to a first subset of the set of web documents satisfying the importance value threshold and to generate a relevance value associated with each web document within the first subset of the set of web documents, wherein the relevance value corresponds to a degree of commonality between the plurality of search attributes and the set of vectors for each web document; executing, by the server, a blacklisting protocol configured to receive a second subset of the set of web documents that satisfy a relevance value threshold and to determine whether the second subset of the set of web documents satisfy a pre-determined blacklisting criteria; identifying, by the server, a third subset of the set of web documents based upon a combined value from the importance value, the relevance value, and the pre-determined blacklisting criteria; and revising, by the server, the graphical user interface to display at least a portion of at least one web document within the third subset of the set of web documents, the revision comprising displaying a plurality of browser plates where each browser plate: corresponds to at least one web document within the third subset of the set of web documents and displays at least a portion of the at least one web document, comprises an indicator corresponding to a uniform resource locator of the at least one web document and comprises a hyperlink, whereby when the first user interacts with the hyperlink the server invokes an electronic messaging application and prepopulates an electronic message with a predetermined text string and the uniform resource locator of the at least one web document.

In another embodiment, a computer system comprises a user computing device configured to display a graphical user interface maintained by a server; and a server in communication with the user computing device, the server configured to: retrieve a set of web documents in response to a plurality of search attributes inputted by a first user while interacting with the graphical user interface, the plurality of search attributes comprising at least an attribute associated with a second user; extract a set of terms from each web document; generate a set of vectors representing an n-gram value corresponding to each term within the set of terms; execute a first artificial intelligence model comprising a multi-layer neural network, the first artificial intelligence model being configured to receive the set of vectors for each web document and to generate an importance value associated with each web document; execute a second artificial intelligence model configured to receive a first subset of the set of vectors corresponding to a first subset of the set of web documents satisfying the importance value threshold and to generate a relevance value associated with each web document within the first subset of the set of web documents, wherein the relevance value corresponds to a degree of commonality between the plurality of search attributes and the set of vectors for each web document; execute a blacklisting protocol configured to receive a second subset of the set of web documents that satisfy a relevance value threshold and to determine whether the second subset of the set of web documents satisfy a pre-determined blacklisting criteria; identify a third subset of the set of web documents based upon a combined value from the importance value, the relevance value, and the pre-determined blacklisting criteria; and revise the graphical user interface to display at least a portion of at least one web document within the third subset of the set of web documents, the revision comprising displaying a plurality of browser plates where each browser plate: corresponds to at least one web document within the third subset of the set of web documents and displays at least a portion of the at least one web document, comprises an indicator corresponding to a uniform resource locator of the at least one web document; and comprises a hyperlink, whereby when the first user interacts with the hyperlink the server invokes an electronic messaging application and prepopulates an electronic message with a predetermined text string and the uniform resource locator of the at least one web document.

In another embodiment, a computer-implemented method comprises upon receiving an input of a plurality of search attributes, generating, by a server, an importance value of each web document responsive to the input; generating, by the server, a relevance value of each web document responsive to the input; generating, by the server, a graphical user interface configured to present a listing of each web document having an importance value and relevance value exceeding a threshold; and upon receiving a selection on the graphical user interface, generating, by the server, an electronic message directed to an address associated with at least one search attribute and containing a hyperlink to a selected web document of the listing.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1A:
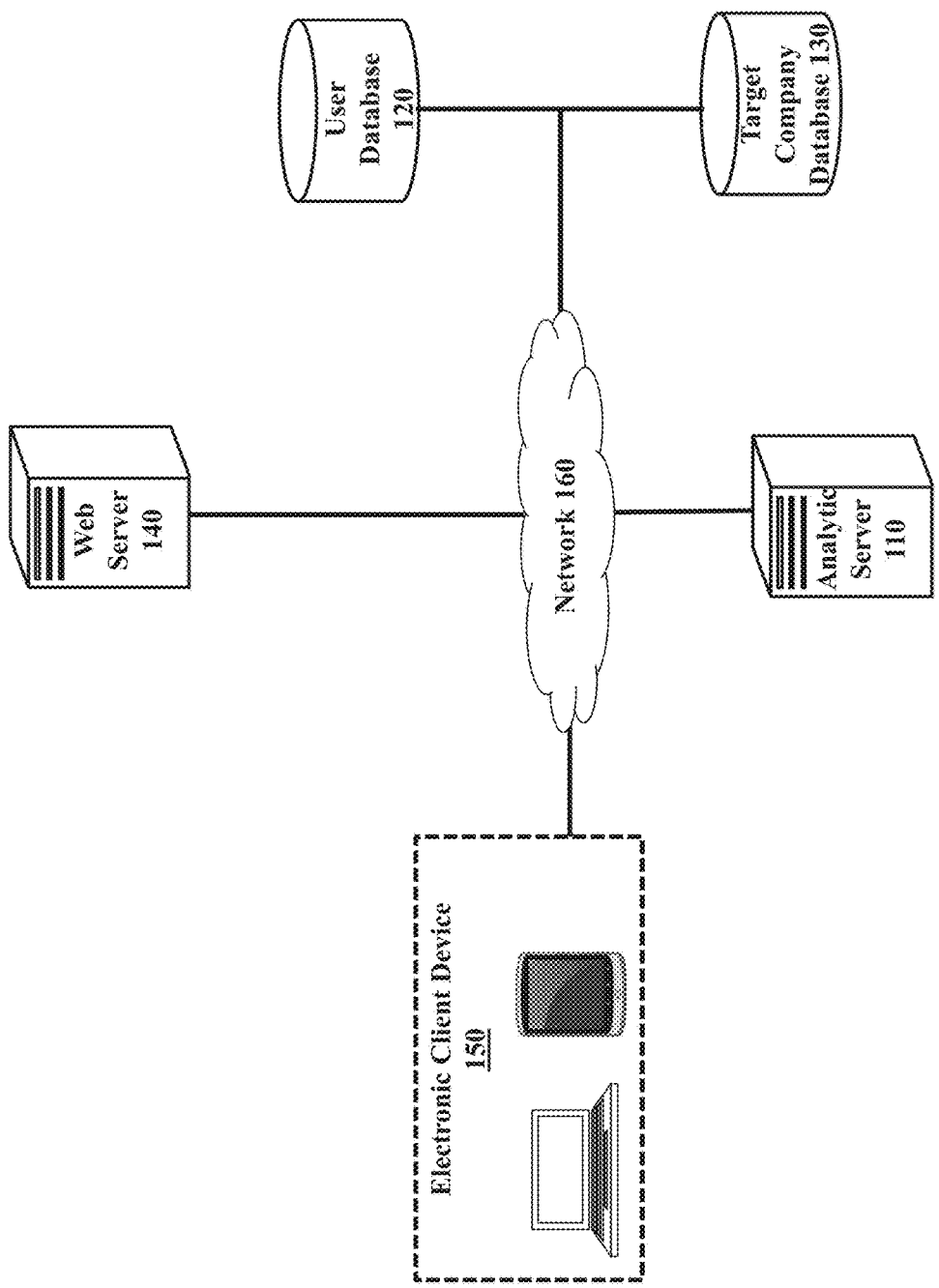
FIG. 1A illustrates a computer system for trigger-based personalized sales outreach, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1A illustrates components of an exemplary system 100A for trigger-based personalized sales outreach, according to an embodiment. The exemplary system 100A may comprise an analytic server 110, a user database 120, a target company database 130, a web server 140, and an electronic client device 150 that are connected with each other via hardware and software components of one or more networks 160. Examples of the network 160 include, but are not limited to, Local Area Network (LAN), Wireless Local Area Network (WLAN), Metropolitan Area Network (MAN), Wide Area Network (WAN), and the Internet. The communication over the network 160 may be performed in accordance with various communication protocols, such as Transmission Control Protocol and Internet Protocol (TCP/IP), User Datagram Protocol (UDP), and IEEE communication protocols.

The electronic client device 150 may be any computing device allowing a user/client to interact with analytic server 110. The electronic client device 150 may be any computing device comprising a processor and non-transitory machine-readable storage medium allowing the electronic client device 150 to perform the various tasks and processes described herein. The examples of the computing device may include, but are not limited to, a desktop computer, a laptop, a personal digital assistant (PDA), a smartphone, a tablet computer, and the like.

The electronic client device 150 may execute an Internet browser or local application that accesses the analytic server 110 in order to issue requests or instructions. The electronic client device 150 may transmit credentials from user inputs to the analytic server 110, from which the analytic server 110 may authenticate the user and/or determine a user role. The electronic client device 150 may comprise any number of input devices configured to receive any number of data inputs, including various types of data inputs allowing for authentication (e.g., username, passwords, certificates, and biometrics).

The electronic client device 150 may be configured to communicate with the analytic server 110 through one or more networks 160, using wired and/or wireless communication capabilities. In operation, the electronic client device 150 may execute a trigger-based sales outreach program, which may include a graphical user interface (GUI) that renders an interactive layout, schematic, or other elements for the user to input a request. The user may be a salesperson trying to outreach potential buyers and provide the potential buyers with goods/services the user brings to the market. The analytic server 110 may generate a GUI for the user to input the information on requirements and needs for potential buyers. For example, the GUI may include an interactive user interface for the user to upload a list of target companies/people the user is interested in, and another interactive user interface for the user to upload the goods/services the user brings to the market. The GUI may further comprise a text-based interface or option-based interface for the user to input interesting topics.

An analytic server 110 may be any computing device comprising a processor and other computing hardware and software components, configured to process the requests received from the electronic client device 150. The analytic server 110 may be logically and physically organized within the same or different devices or structures, and may be distributed across any number of physical structures and locations (e.g., cabinets, rooms, buildings, cities). Upon the analytic server 110 receiving the request from the electronic client device 150 to reach out to potential buyers within the list of target companies/people, the analytic server 110 may search the web server 140 for any potential triggers. The web server 140 may comprise a variety of sources, including the websites of print media/publications, earning calls, market movements websites, social media, conference speakers' web accounts, TV news, business news channels, and the like. The analytic server 110 may web crawl the variety of sources' web documents, scrape information related to the target companies or people. The analytic server may find news items the user/salesperson is interested in from the variety of sources. Such news items may be events, news, posts, and any other information that are relevant to the potential buyers (e.g., the target companies and/or people). The analytic server 110 may store the request from the user into the user database 120 and store the news items relevant to each target company/person into the target company database 130.

In operation, the analytic server 110 may determine an importance score for each news item. The importance score of a particular news item may measure the probability of a general sales representative being interested in the particular news item without regard to the goods/services the sales representative offers. The analytic server 110 may first train a general propose neural network that determines the importance score. The analytic server 110 may apply a set of filters comprising a network of neural networks, hunter-killers, and hard pass filters to filter out the false positives. The analytic server 110 may further determine a relevance score for each news item. The relevance score may determine the level of relevancy between a news item and a target company/person. The analytic server 110 may store the importance score and the relevance score for each target company/person into the target company database 130. Furthermore, the analytic server may train a neural network model that categorizes the news items into a list of possible categories/topics. The analytic server 110 may generate a graphical user interface (GUI) to display the news items and allow the user to perform various operations on the news items. For example, the GUI may also include an interactive element (e.g., button) for the user to reach out to a target company or person. The user may be able to select one of the target companies/people to reach out to and one of the news items as a basis of the outreach. The analytic server 110 may generate an electronic message template prepopulated with information of the news item. The analytic server may store the user's selection of the news items into the user database 120.

The user database 120 may be any non-transitory machine-readable media configured to store data. For example, the user database 120 may be a database that stores the user identifier and attributes, the user's request comprising the user's interested potential buyers, the user's provided goods/services, the user's interested topics, the user's selection of news items, the user's preferences, and any other user data provided by the user via the graphical user interface.

The target company database 130 may be any non-transitory machine-readable media configured to store data. The target company database 130 may store information of each target company/person, including the identifier of the target company/person, description of the target company/person, the news items relevant to the target company/person, vectorized words of the news items, importance scores, relevance scores associated with each news item, categories associated with each news items and a score for each category, and any other data relevant to the target companies/people.

The web server 140, also called an HTTP server, may be any computing device comprising a processor and other computing hardware and software components, configured to host content, such as a website. A website is a collection of related web pages, including multimedia content, typically identified with a common domain name, and published on at least one web server. A website may be accessible via one or more networks 160 including a public Internet Protocol (IP) network, such as the Internet, or a private local area network (LAN). The web server 140 may also comprise software that runs on the computing device that retrieves and delivers the web pages in response to requests from the analytic server 110. Web pages are documents, typically composed in plain text interspersed with formatting instructions of Hyper Text Markup Language (HTML, XHTML). Web pages from one website may incorporate elements from other websites with suitable markup anchors. The web server 140 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices of various sizes, including desktop computers, laptops, PDAs and cell phones.

The analytic server 110 may access the web servers 140 and web crawl contents or texts from web pages hosted in web servers 140. The analytic server 110 may find news items the salesperson is interested in from the variety of sources. Such news items may be events, news, posts, quotes and any other information that are related to the potential buyers (e.g., the target companies and/or people). Based on the news items, the analytic server 110 may perform vectorization and calculate the importance scores and relevance scores.

Figure 1B:
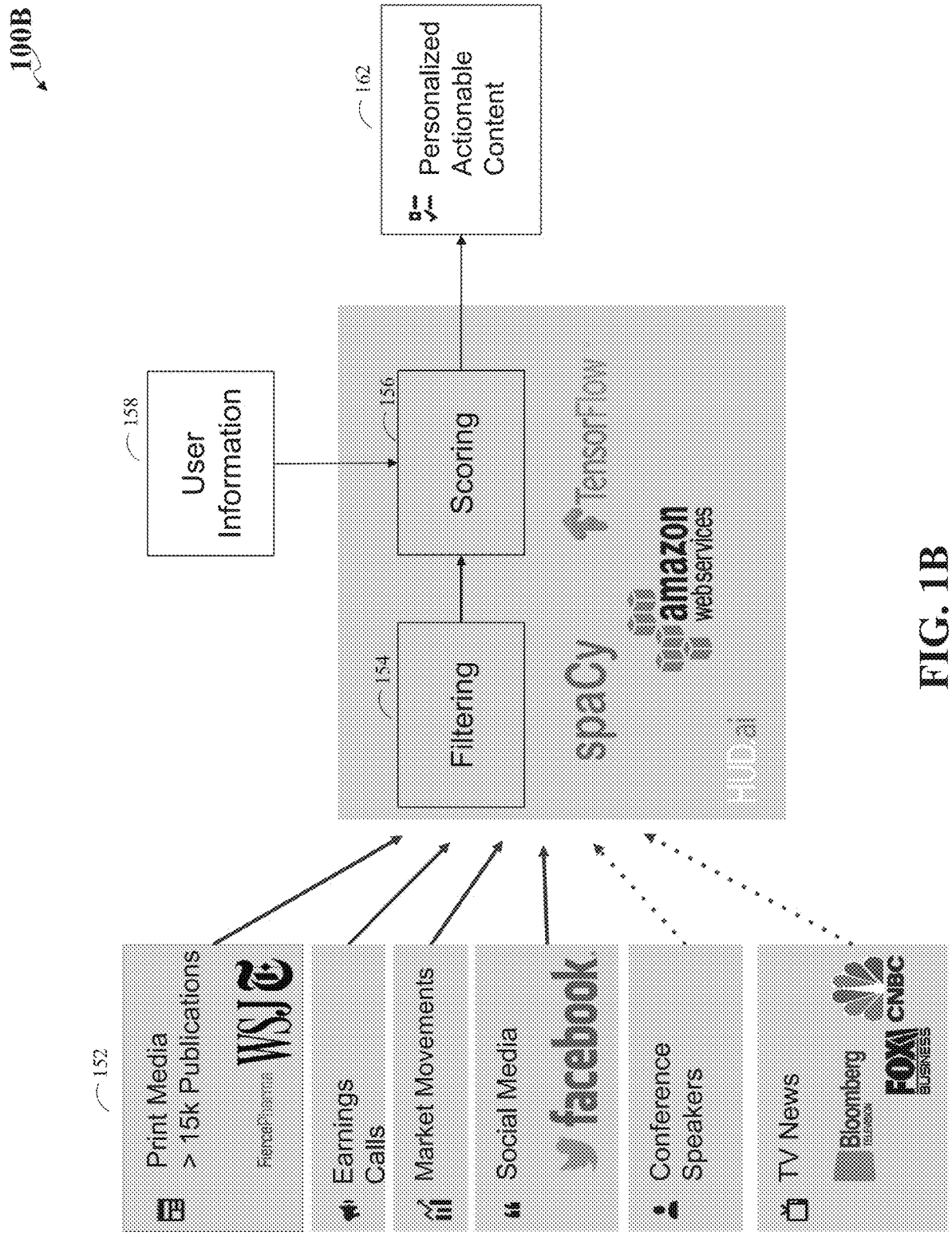
FIG. 1B illustrates an example of method components for trigger-based personalized sales outreach, according to an embodiment.

FIG. 1B illustrates method components of trigger-based personalized sales outreach 100B, according to an embodiment. The analytic server may constantly scan a variety of sources 152 for any potential triggers within the list of target companies. The variety of sources may include the websites of print media/publications, earning calls, market movements websites, social media, conference speakers' web accounts, TV news, business news channels, and the like. The analytic server may web crawl the variety of sources' web documents, scrape information related to the target companies or people. The analytic server may have access to the transcripts of the videos and/or audios in the variety of sources. The analytic server may use neural network to capture news items (e.g., contents, video/audio segments, texts, and the like) that a general salesperson is interested in.

The news items may include false positives, such as noise or unimportant information. For example, some fake articles may look a lot like regular articles that a salesperson would be interested in. The analytic server may implement filtering algorithms 154 to filter out/exclude the false positives. The analytic server may apply a set of filters comprising a network of neural networks, hunter-killers, and hard pass filters. Each neural network in the network of neural networks may focus on one subcategory of the false positives. For example, the different false positives may have different problems. Each neural network may be hunter-killers whose job is to find and kill for one specific problem. The hard pass filters may do hard kills in a deterministic way. For example, the analytic server may kill news items based on the URLs (Uniform Resource Locator).

The analytic server may also implement scoring algorithms 156 for determining the importance scores and relevance scores for each news item. The analytic server may train a neural network that determines the importance scores. The analytic server may also determine a relevance score for each news item based on vectorization of the words in the news items. The analytic server may take a first block of text from the news item. The analytic server may take a second block of text of the user request 158, which describes the target company's/person's businesses the user cares about. The analytic server may vectorize the first and second blocks of text, and further calculate the relevance score based on the vectorized words from the first and second blocks of text.

The analytic server may use the news items as triggers to reach out to target companies/people. For example, the analytic server may generate electronic message template addressed to a particular target company. The electronic message template may be prepopulated with personalized news items the particular target company is interested in. The user may be able to edit/revise the template by performing any customization on the template. As a result, the electronic message template may include personalized, editable and actionable content 162.

Figure 2:
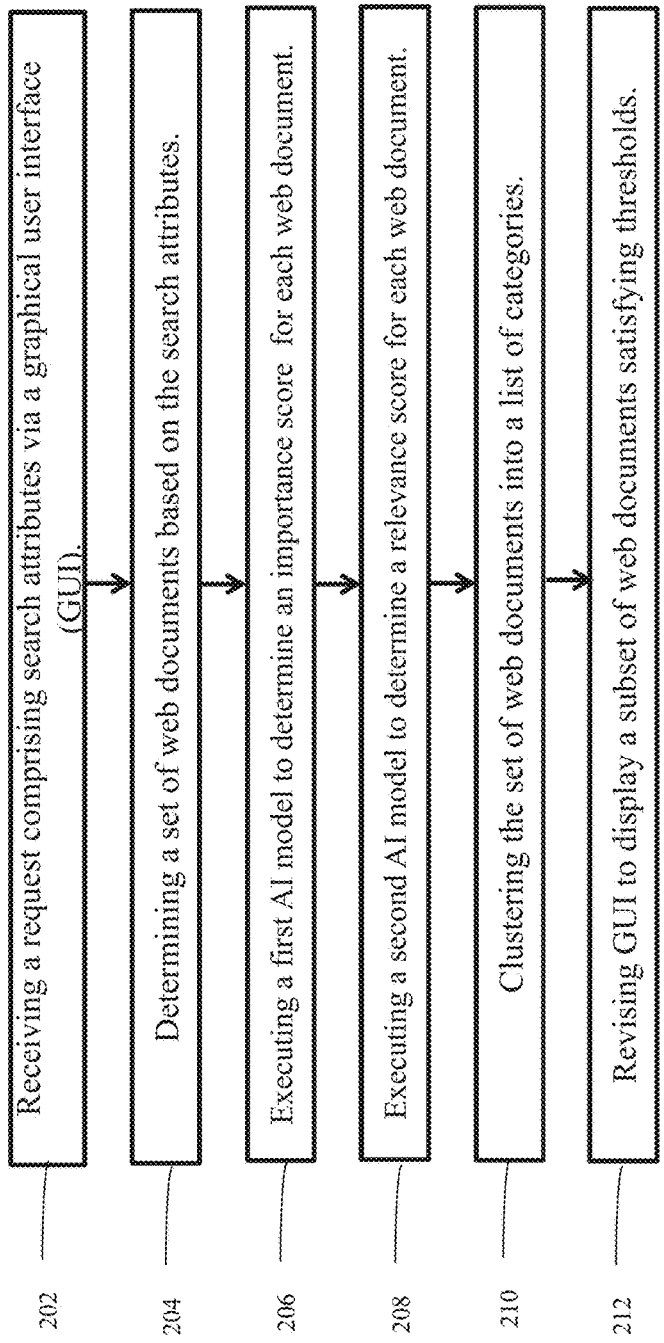
FIG. 2 illustrates a flowchart depicting operational steps for trigger-based personalized sales outreach, according to an embodiment.

FIG. 2 illustrates a flowchart depicting operational steps for trigger-based personalized sales outreach, according to an embodiment. Other embodiments may comprise additional or alternative steps, or may omit some steps altogether.

At step 202, the analytic server may receive a request from a user via a graphical user interface (GUI). The user may be a salesperson trying to outreach potential buyers and provide the potential buyers with goods/services the user brings to the market. The request may comprise a plurality of search attributes including a list of companies that the salesperson is interested in, a list of goods/services the salesperson has to offer, and topics that the salesperson finds interesting to the potential buyers. The analytic server may generate a GUI to receive the request. Specifically, the GUI may include an interactive user interface for the user to upload the list of target companies/people the user is interested in, and another interactive user interface for the user to upload the goods/services the user brings to the market. The GUI may further comprise a text-based interface or option-based interface for the user to input interesting topics.

At step 204, the analytic server may determining a set of web documents in response to the plurality of search attributes by constantly scanning a variety of sources to identify any potential triggers for the list of target companies. The variety of sources may include the websites of print media/publications, earning calls, market movements websites, social media, conference speakers' web accounts, TV news, business news channels, and the like. The analytic server may web crawl the variety of sources' web documents, scrape information related to the target companies or people. The analytic server may identify the set of web documents corresponding to news items the salesperson is interested in from the variety of sources. Such news items may be web documents of events, articles, news, posts, quotes, and any other information that are relevant to the potential buyers (e.g., the target companies and/or people). The analytic server may receive the set of web documents via an RSS (Rich Site Summary) feed. The set of web documents may comprise at least one of a web document, new articles, scraped data from one or more web pages, closed captioning from a video, and scraped data from one or more social media platforms, and the like.

For example, the analytic server may scan the Wall Street Journal and other more than 15,000 publications, track stock market movements, and find unusual significant stock price movements and find news, updates or information that is relevant to the target companies and/or people. For instance, the analytic server may find an article about strategic threat that a target company may be interested in. The analytic server may find the 10,000 biggest companies in the world in a certain topic/business and keep tracking anything new in the business by tracking the upcoming events and news from the companies. The analytic server may access the websites of the companies and find the key executives and further find the executives' web accounts, such as Twitter accounts and any other social media accounts, and keep track of the updates on Twitter and other social media. In another example, the analytic server may focus on business news channels and have access to the transcripts. The analytic server may find that there is one minute segment on Bloomberg talking about a particular company or person included in the list of target companies/people. The analytic server may capture the segment of the video and the text/transcript. In another example, the analytic server may learn that there are a very large number of business conferences happening in major global markets. The analytic server may go to the conference websites, find speakers, and capture information of the speakers. The news items, including the information, news, updates, posts, and the like, captured by the analytic server, may serve as triggers for sales outreach after the analytic server determines such news items are qualified triggers.

At step 206, the analytic server may determine an importance score for each news item by executing an artificial intelligence model. The importance score of a particular news item may measure the probability of a general sales representative being interested in the particular news item without regard to the goods/services the salesperson offers. The analytic server may execute an artificial intelligence model, for example, the analytic server may train a neural network called an LSTM (long short-term memory) neural network, which is effective of taking text strings of the news items and relating the text strings to an outcome. The outcome may be the probability of a news item being an important piece of information to a generic sales representative. LSTM networks are building units for layers of a recurrent neural network (RNN). A common LSTM unit is composed of a cell, an input gate, an output gate and a forget gate. The cell is responsible for "remembering" values over arbitrary time intervals. Each of the gates can be thought of as a "conventional" artificial neuron, as in a multi-layer (or feedforward) neural network: that is, they compute an activation (using an activation function) of a weighted sum. The gates can also be analogous to regulators of the flow of values that go through the connections of the LSTM. The forget gate controls the extent to which a value remains in the cell and the output gate controls the extent to which the value in the cell is used to compute the output activation of the LSTM unit. The expression long short-term refers to the fact that LSTM is a model for the short-term memory, which can last for a long period of time. An LSTM is well-suited to classify, process and predict time series given time lags of unknown size and duration between important events.

The analytic server may clean the text of the web document of each news item, extract a set of terms from the web document, deobfuscate the terms, vectorize the terms in the text, and build the neural network. The analytic server may deobfuscate the set of terms from each web document prior to generating the set of vectors for each respective web document. The analytic server may generate a set of vectors for the set of terms, with each vector value representing an n-gram value corresponding to each term within the set of terms. To vectorize the terms in text, the analytic server may employ vector space model or term vector model that is an algebraic model for representing text documents (and any objects, in general) as vectors of identifiers, such as index terms. The analytic server may consider the word order of the text strings in the news items. Furthermore, the analytic server may consider not only what words are in the block of text in the news items, but also how a word relates to one another. For example, the word "ugly" followed by "duckling" means something totally different than "ugly" and "duckling" in two different parts of the sentence.

The analytic server may execute an artificial intelligence model, for example, the analytic server may first train a general propose neural network that determines the importance score, which is the probability that a particular news item would be an important piece of information to a generic sales representative. The general purpose neural network may determine the importance score based on the vectorization of the text of the news item. The general purpose neural network may be more permissive, thus may include false positives, such as noise or unimportant information. For example, some articles, posts, news, web pages may look a lot like regular news items that a salesperson would be interested in. However, such news items may be false positives, such as fake articles. Fake articles may be constantly changing the domain and slightly tweaking the content.

To filter out the false positives, the analytic server may apply a set of filters comprising a multi-layer neural network (which is a network of neural networks), hunter-killers, and hard pass filters. As discussed above, fake articles/news items may be constantly changing the domain and slightly tweaking the content. As a result, the false positives may include many different subcategories or fine-grained distinctions. Each neural network in the network of neural networks may focus on one subcategory of the false positives. For example, the different false positives may have different problems. Each neural network may be hunter-killers whose job is to find and kill for one specific problem.

In addition, the set of filters for false positives may include hard pass filters, which do hard kills in a deterministic way. For example, the analytic server may filter out false positives based on the domain name of each news item. Specifically, the analytic server may determine that URLs ending in .eu, .acu, .uk are not important news items that a general salesperson would be interested in.

After performing the general purpose neural network and the set of filters, the analytic server may generate a list of news items that are determined to be important news items a general salesperson would be interested in, with each news item having an importance score. The analytic server may select a first subset of news items with importance scores satisfying an importance score threshold.

At step 208, the analytic server may determine a relevance score for each news item within the first subset of news items by executing another artificial intelligence model. The relevance value may correspond to a degree of commonality between one or more search attributes and a set of vectors corresponding to the first subset of news items. The relevance score may determine the level of relevancy between a news item and a target company/person. The analytic server may take a first block of text from the news item. The analytic server may take a second block of text corresponding to the user request, which describes the target company's/person's businesses the user cares about. The analytic server may vectorize the first and second blocks of text, and further calculate the relevance score based on the vectorized words from the first and second blocks of text. The analytic server may execute artificial intelligence model and determine the relevance score using a set of similarity metrics. As a result, the relevance score may reflect how closely related/similar the news item and the target company/person are based on the news item content and the description of what the target company/person does for business. The analytic server may select a second subset of the news items with relevance scores satisfying a relevance score threshold. In some embodiments, the analytic server may implement elastic search for determining the similarity.

However, the analytic server may not be able to distinguish certain noise by merely using relevance score. For example, the analytic server may not be able to distinguish the company Gucci and a person named Gucci Mane. Therefore, the analytic server may apply a set of hard pass filters to further distinguish the relevant news items. The analytic server may execute a blacklisting protocol comprising a pre-determined blacklisting criteria. Specifically, the analytic server may build a whitelist and a blacklist. The whitelist may comprise the terms that need to be included in the text of news items, and any other standards such as a certain name must be capitalized, and the like. The blacklist may include the terms that should not appear in the text of news items. The analytic server may check if the news items satisfy the whitelist and blacklist and exclude the news items not satisfying the whitelist and blacklist. The analytic server may generate the whitelist and blacklist based on user's input via a GUI. The analytic server may identify a third subset of the news items based on a combined value from the importance score, the relevance score, and the pre-determined blacklisting criteria. In some embodiments, the analytic server may generate an alert for each news item (web document) within the third subset of news items and transmit the alert to a user computing device.

At step 210, the analytic server may cluster the news items into a list of categories. The analytic server may train a neural network model that categorizes the third subset of the news items into a list of possible categories/topics. The list of categories may include personnel, HR (human resources), finance, M&A (mergers and acquisitions), technology, and the like. More specifically, the analytic server may execute the neural network model to determine the probability of a news item being in each category based on one or more attributes of the news item. For example, the analytic server may extract a piece of text from an article, and determine the article is mostly likely an HR article, or a finance article, or an M&A article. The analytic server may determine a score, which may be a probability value ranging from 0 to 1, for each category. Assume there are ten categories, the analytic server may determine ten scores with each score reflecting the news items being within each of the categories.

The analytic server may cluster/group the news items based on the categories and provide the option to show news items in a certain category in a GUI. For example, a user may request to show the news items related to M&A events by interacting with the GUI. The analytic server may only display the news items related to M&A. In operation, the analytic server may display the news items with scores of M&A category satisfying a threshold. In some embodiments, the analytic server may rank the news items in a certain category according to the scores. In other words, the news item with highest score (e.g., the news item most likely in a certain category) is displayed first.

In some embodiments, the analytic server may find similar articles or any other news items and group them. For example, the analytic server may use searching engines, such as Google, Bing, DuckDuckGo, and the like, to find other news items similar to the most important or most relevant news items, and group them under different categories.

At step 212, the analytic server may revise the graphical user interface (GUI) to display the third subset of news items that satisfy certain thresholds and allow the user to perform various operations on the news items. For example, the GUI may display the news items including articles, quotes, news, twitters related to the list of target companies/people. In some other embodiments, the analytic server may display the news items ranked according to the importance scores. In some other embodiments, the analytic server may display the news items ranked according to the relevance scores. In some other embodiments, the analytic server may display the news items ranked according to the recentness, such as the timestamp of the news items. Alternatively, the analytic server may rank the news items based on the balance of the importance, relevance, and recentness. For example, the analytic server may determine a combined value of the importance, relevance and recentness based on a weighted value for each factor. In operation, the analytic server may provide the ordering options on a GUI. A user may choose to order the news items based on different factors (e.g., importance, relevance, recentness) by interacting with the GUI. The GUI may also include option-based interactive elements that allow the user to further filter the news items based on topics, content types, groups, and key terms.

The GUI may also include an interactive element (e.g., button) for the user to reach out to a target company or person. The user may be able to pick one of the target companies/people to reach out to and one of the news items as a basis of reaching out. For example, when the user interacts with (e.g., click) the element, the analytic server may generate an electronic message template prepopulated with information of the user, information of the target company, information of the news items. For example, the template may be an electronic email message prepopulated with the user's name, user's signature line, the receiver's email address, the title, and the content. The content may comprise a link of the news item or the original news item (e.g., article, post, speech, news, twitter, and the like) relevant to the target company. The content of the prepopulated electronic message may further comprise a pre-determined text. The user may be able to edit/revise the template by performing any customization on the template. The electronic message may be an email, a tweet, a Facebook message, a text message, and the like.

In some embodiments, the analytic server may keep track of the user's selections and preferences of the news items for the reaching out. The analytic server may train an artificial intelligence model that learns the user's preferences and recommend news items based on the user's preferences. As a result, the user may get more news items matching the user's interests. The GUI may further comprise an option for an end-user to no longer display one or more news items within the third subset of news items. For example, the GUI may include a closing button for each news item. The analytic server may receive the user's response indicating that one or more news items are designated as unsatisfactory. The analytic server may retain the artificial intelligence models based on the feedback of the one or more news items. In some embodiments, the analytic server may execute a user-specific artificially intelligence model to determine/identify a likelihood of the user designating one or more news items within the third subset of news items as unsatisfactory. The user-specific artificially intelligence model may be a naïve Bayesian model.

In some other embodiments, the analytic server may recommend news items without considering the user's preferences to avoid the filtering to happen at a user level. As a result, the user may get news items not only in the interested topics but also in other topics to have a broader scope of options.

The disclosed systems and methods increase the quantity and quality of personalized outreach. The disclosed systems and methods outreach potential buyers at the right time based on a trigger mechanism and perform deep research on the potential buyers for personalized outreach.

Figure 3:
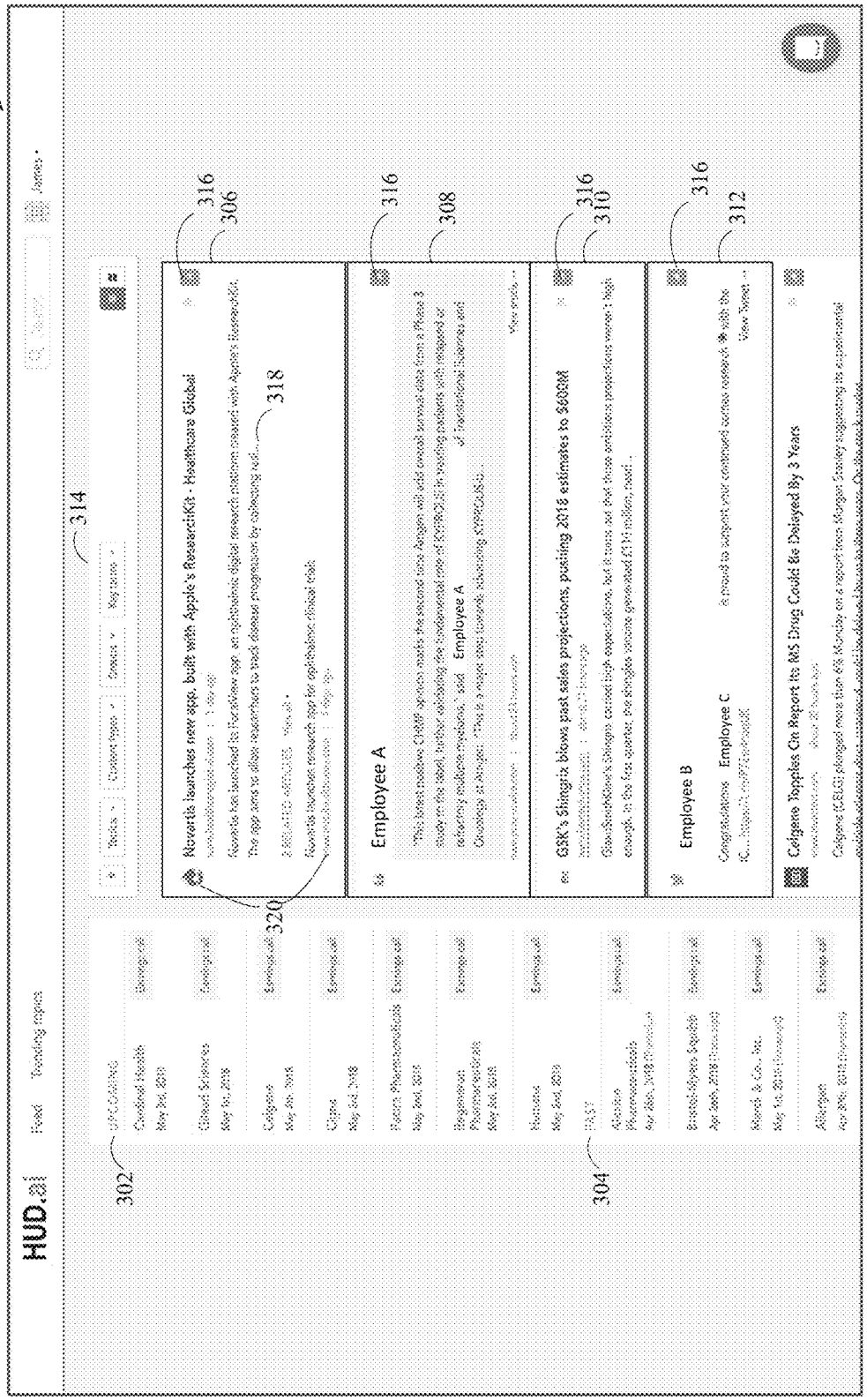
FIG. 3 illustrates an example of a graphical user interface for displaying the news items, according to an embodiment.

FIG. 3 illustrates an example of a graphical user interface 300 for displaying the news items, according to an embodiment. The analytic server may constantly scan a variety of sources for any potential triggers for the list of target companies/people. The analytic server may scan sources including websites of print media/publications, earning calls, market movements websites, social media, conference speakers' web accounts, TV news, business news channels, and the like. The analytic server may web crawl the variety of sources' web documents, scrape information from the web document. In addition, the analytic server may have access to the transcripts of videos and earning calls and may capture key evidence and other relative information in the transcripts.

As shown in the figure, the analytic server may find the feed of information or news items, which is useful and important, and can be used as a basis of reaching out to the target companies/people. Such feed of information may include news items of upcoming events (e.g., upcoming earning calls) 302, past events (e.g., past earning calls) 304, articles 306, quotes 308, news 310, posts (e.g., twitter posts) 312, and the like. The GUI 300 may display each of the news items in a browser plate. Within each browser plate, the GUI 300 may display at least a portion of the web document of the news item 318 and an indication corresponding to a URL (uniform resource locator) of the web document 320. Within each browser plate of the news item, the GUI 300 may include an interactive component or a hyperlink (e.g., a sharing button) 316 that allows the user to reach out companies/people based on the news item. For example, when the user interacts with (e.g., click) the component/hyperlink, the analytic server may invoke an electronic messaging application (e.g., email application) and prepopulate an electronic message with a predetermined text string and the URL of the web document. The GUI 300 may also include a filter 314 that provides options for further filtering the feeds/news items based on different factors, such as topics, content types, groups, and key terms.

Figure 4:
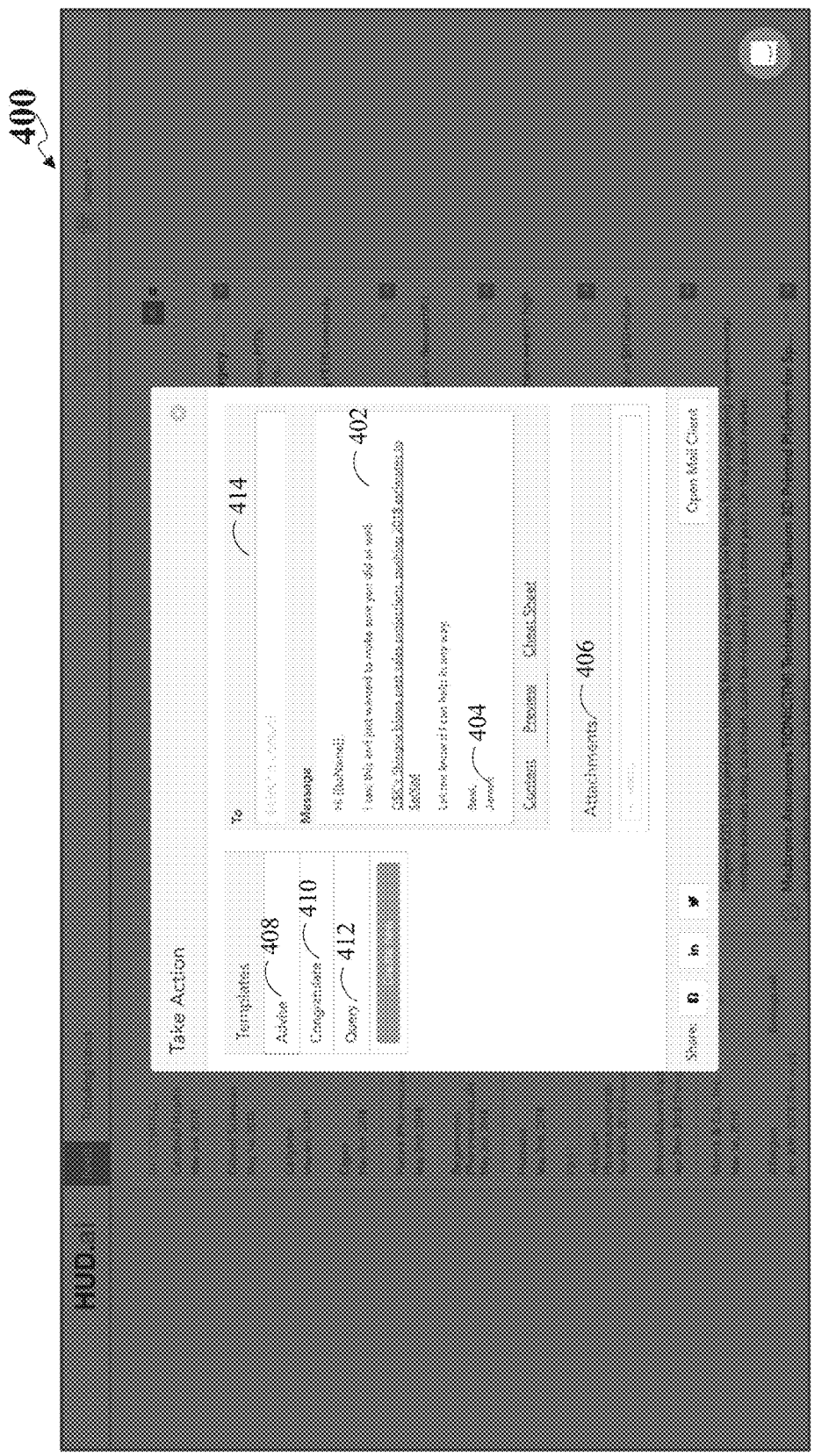
FIG. 4 illustrates an example of a graphical user interface for displaying an electronic email template, according to an embodiment.

FIG. 4 illustrates an example of a graphical user interface 400 for displaying an electronic email template, according to an embodiment. When the user interacts with the sharing button of a news item to reach out a target entity based on the news item, the analytic server may generate the electronic email template. The template may include the new item hyperlink and other predefined content or predetermined text string 402. The template may include the user's signature 404, and allow the use to include attachments 406. In addition, the template may have different types, including advice type 408, congratulate type 410, and query type 412. Templates in different types may have different predefined contents and formats. The analytic server may prepopulate the template based on the user's selection of the type. In some embodiments, the analytic server may prepopulate the receiver's address 414 based on a predefined contact list. In some other embodiments, the analytic server may prepopulate the receiver's address 414 based on a full salesforce contact list. The analytic server may allow the user to edit/revise the template by performing any customization on the template.

Figure 5:
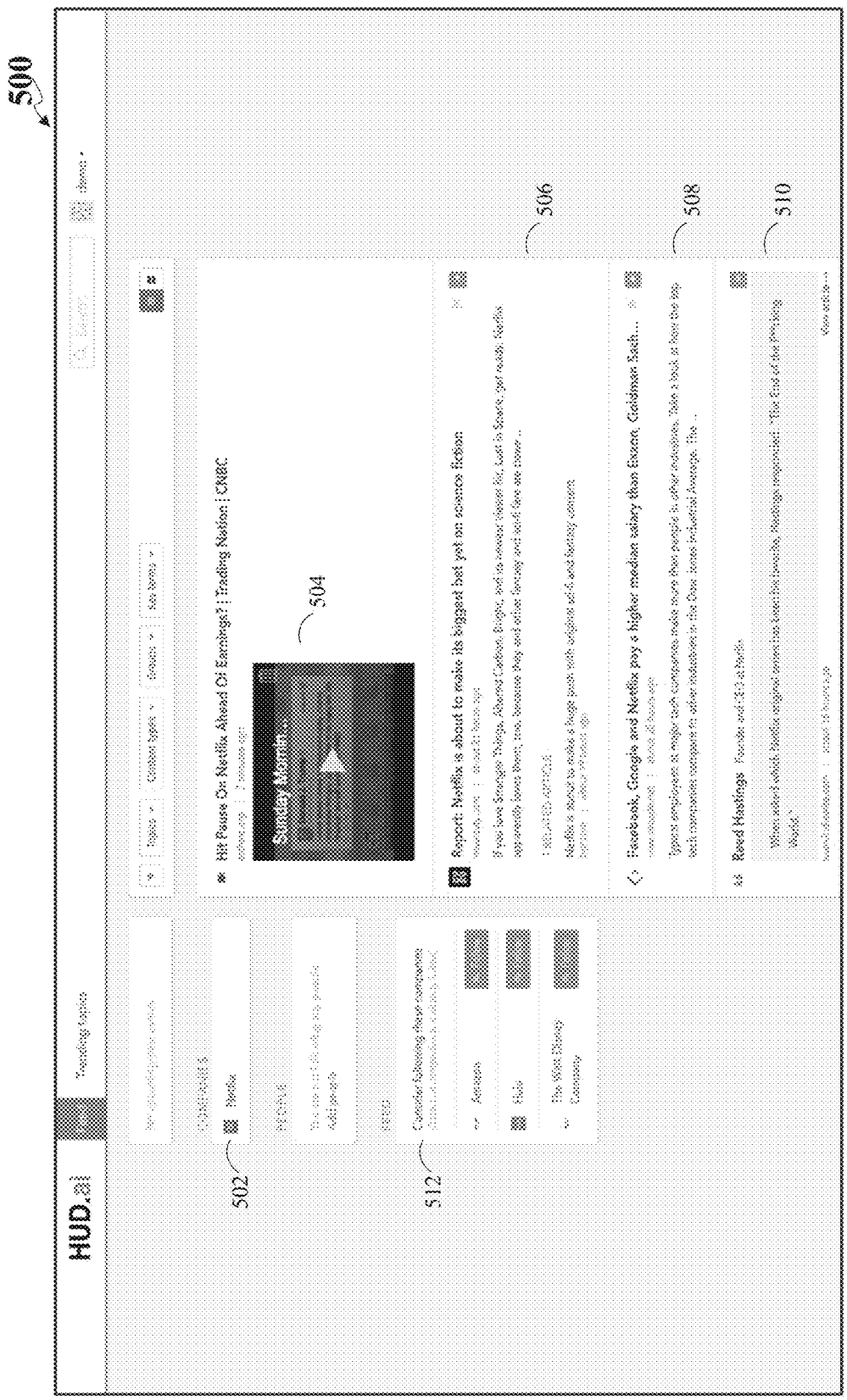
FIG. 5 illustrates an example of a graphical user interface for displaying news items relevant to a target company, according to an embodiment.

FIG. 5 illustrates an example of a graphical user interface 500 for displaying news items relevant to a target company, according to an embodiment. In this case, the user may input a target company "Netflix" 502. The GUI 500 may display the news items relevant to such a target company. The news items may include videos 504 from key channels when the company "Netflix" is mentioned in the videos. The news items may also include articles, news, quotes 506, 508, 510 that are relevant to the target company "Netflix." In addition, the GUI may also include recommendations 512 on other companies that are similar to the target company to allow the user to consider these recommended companies.

Figure 6:
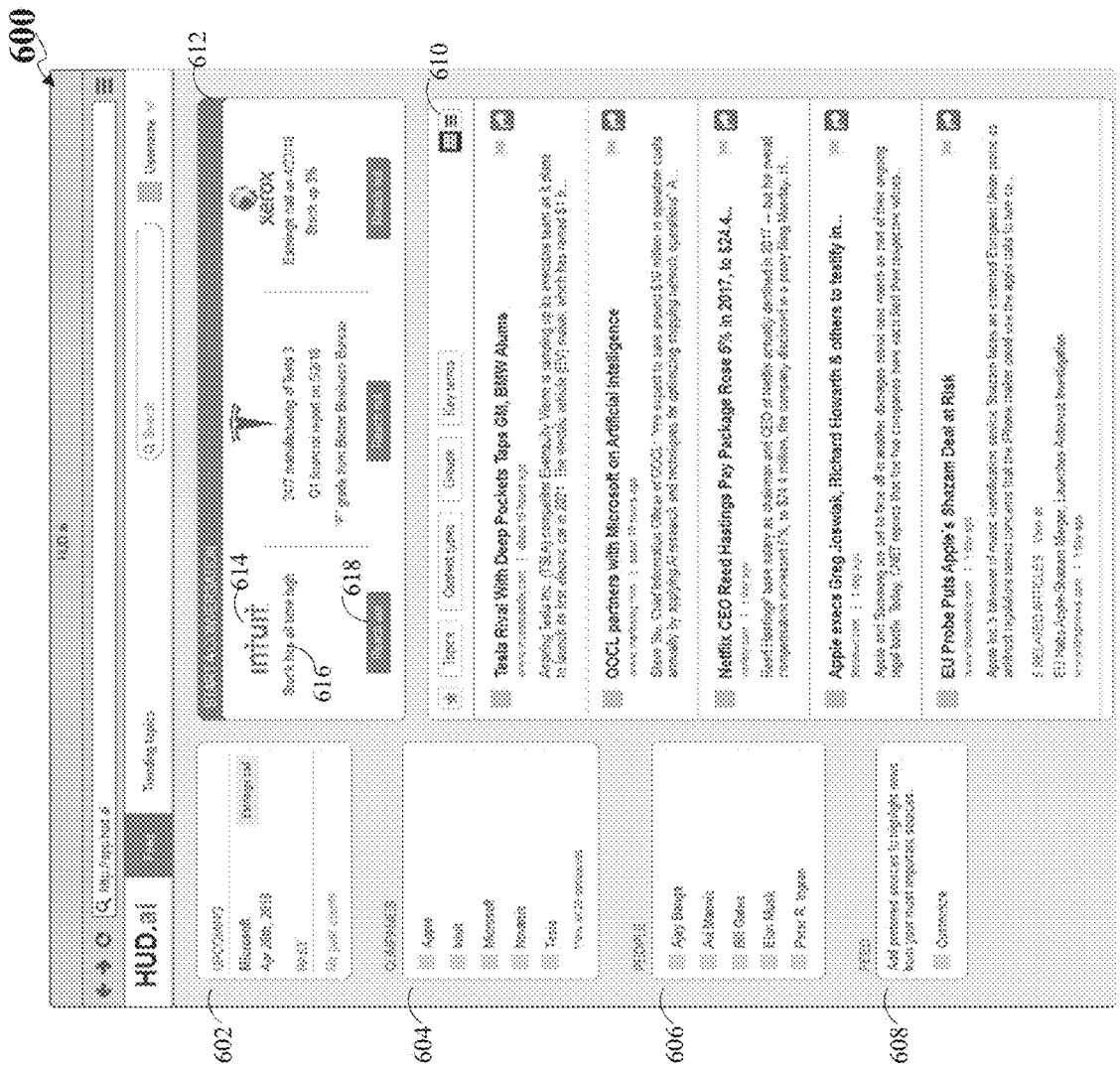
FIG. 6 illustrates an example of a graphical user interface for displaying targeted action items to feed a sales funnel and trigger a sales outreach, according to an embodiment.

FIG. 6 illustrates an example of a graphical user interface 600 for displaying targeted action items to feed a sales funnel and trigger a sales outreach, according to an embodiment. The GUI 600 may include the upcoming and past events 602, the list of target companies 604, the list of target people 606, the feed for preferred sources 608, and the feeds/news items 610 scanned from different sources that are relevant to the target companies/people. Furthermore, the GUI 600 may include a section 612 for targeted action items to trigger a sales outreach. The section 612 may include multiple target companies and allow the user to start a conversation with a particular targeted company. For each targeted company, the GUI may include a logo and/or name (e.g., Intuit) 614 of the company, key evidences (e.g., stock hits all time high) 616, an interactive component for reaching out (e.g., button) 618.

Figure 7:
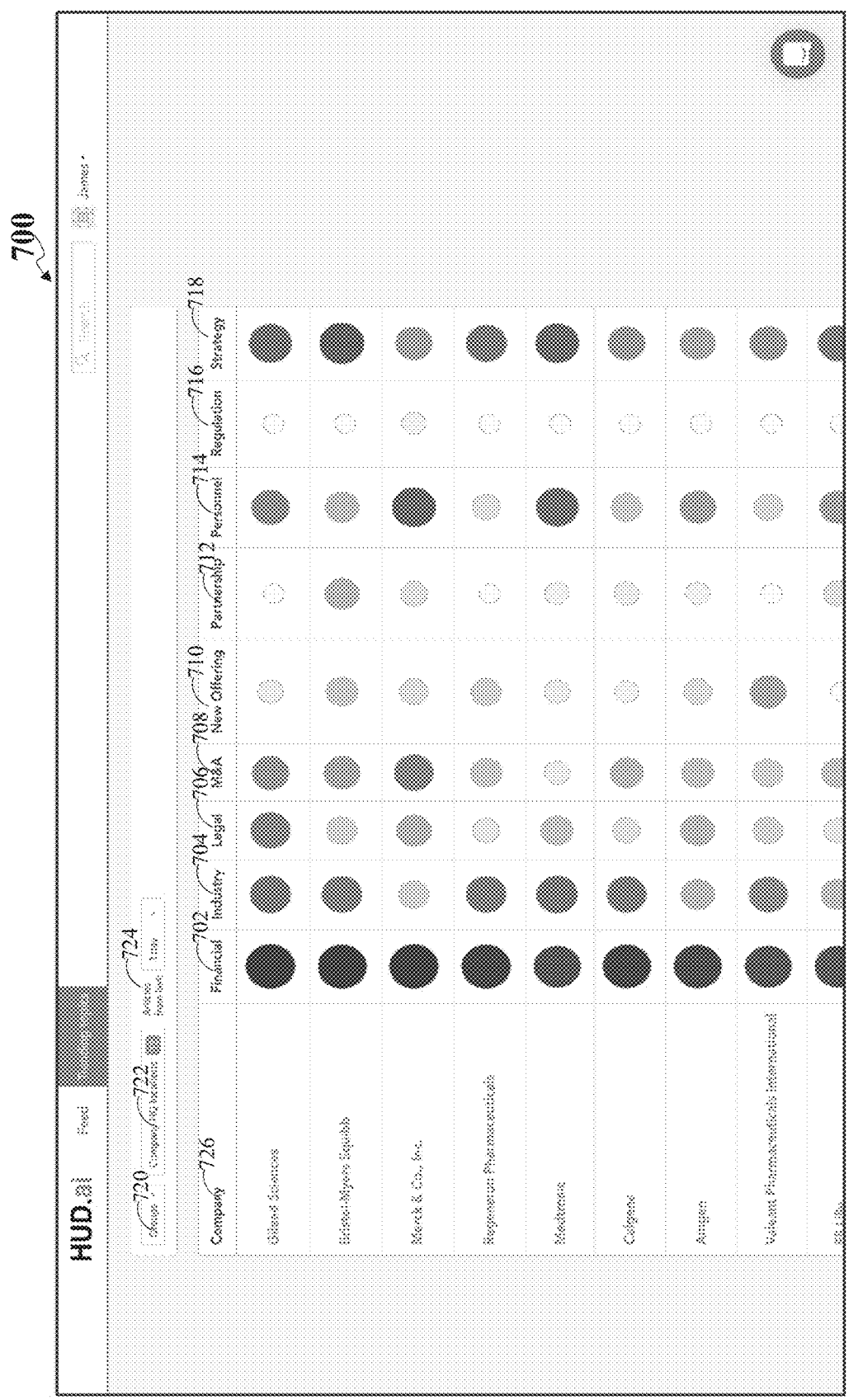
FIG. 7 illustrates an example of a graphical user interface for displaying trending topics, according to an embodiment.

FIG. 7 illustrates an example of a graphical user interface 700 for displaying trending topics, according to an embodiment. As discussed above, the analytic server may categorize each news item relevant to a target company into a list of possible categories/topics. As shown in the figure, the news items for each company 726 are categorized into financial 702, industry 704, legal 706, M&A 708, new offering 710, partnership 712, personal 714, regulation 716, strategy 718. Based on the number of news items within each category, the analytic server may display the trending topics for each company in the form of heat map in the GUI 700. For example, the analytic server may display each topic in different colors and/or shapes based on how popular the topic is (e.g., how many news items are categorized under the topic). Furthermore, the GUI may allow the user to select attributes to display the companies in a certain group 720 and/or in a certain headquarter location 722 by interacting with option-based interactive components (e.g., dropdown menus). The GUI may also provide an option-based interactive component 724 to allow the user to select the news items based on the date of the news items. For example, the user may be able to select news items from last 1 day. Alternatively, the user may be able to select news items from last 5 days.

Figure 8:
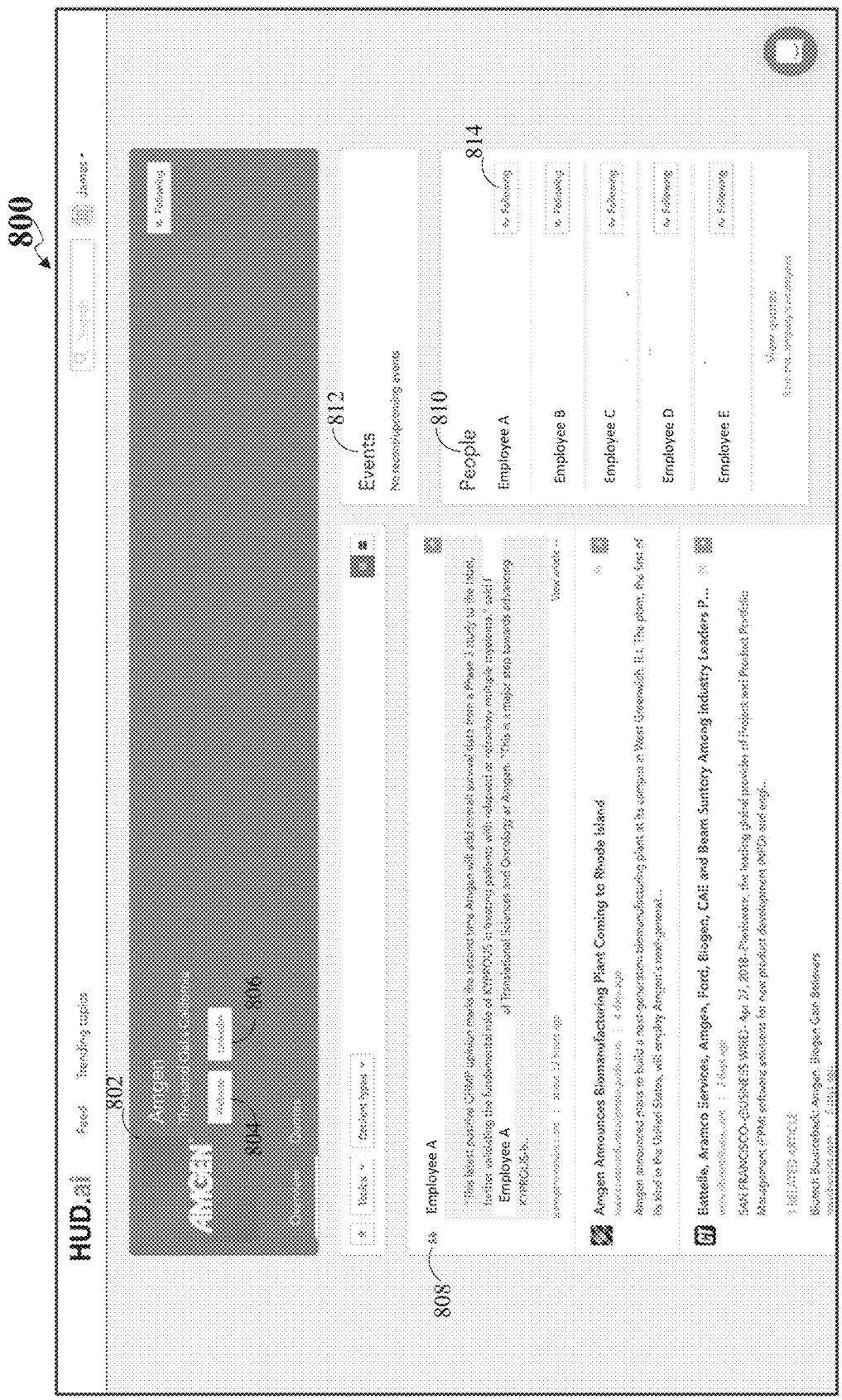
FIG. 8 illustrates an example of a graphical user interface for a deeper view into a particular company, according to an embodiment.

FIG. 8 illustrates an example of a graphical user interface 800 for a deeper view into a particular company, according to an embodiment. The GUI 800 may include the logo/name 802 of a particular company, an interactive element (e.g., button) 804 directing to the official website of the company, an interactive element (e.g., button) 806 directing to the LinkedIn webpage of the company. The GUI may also include the news items 808 relevant to the company (e.g., information when the company is mentioned or quoted), the people 810 from the company with their titles, events/activities 812 of the company. For each person, the GUI may include an interactive element (e.g., button) 814 to allow the user to follow the person.

Figure 9:
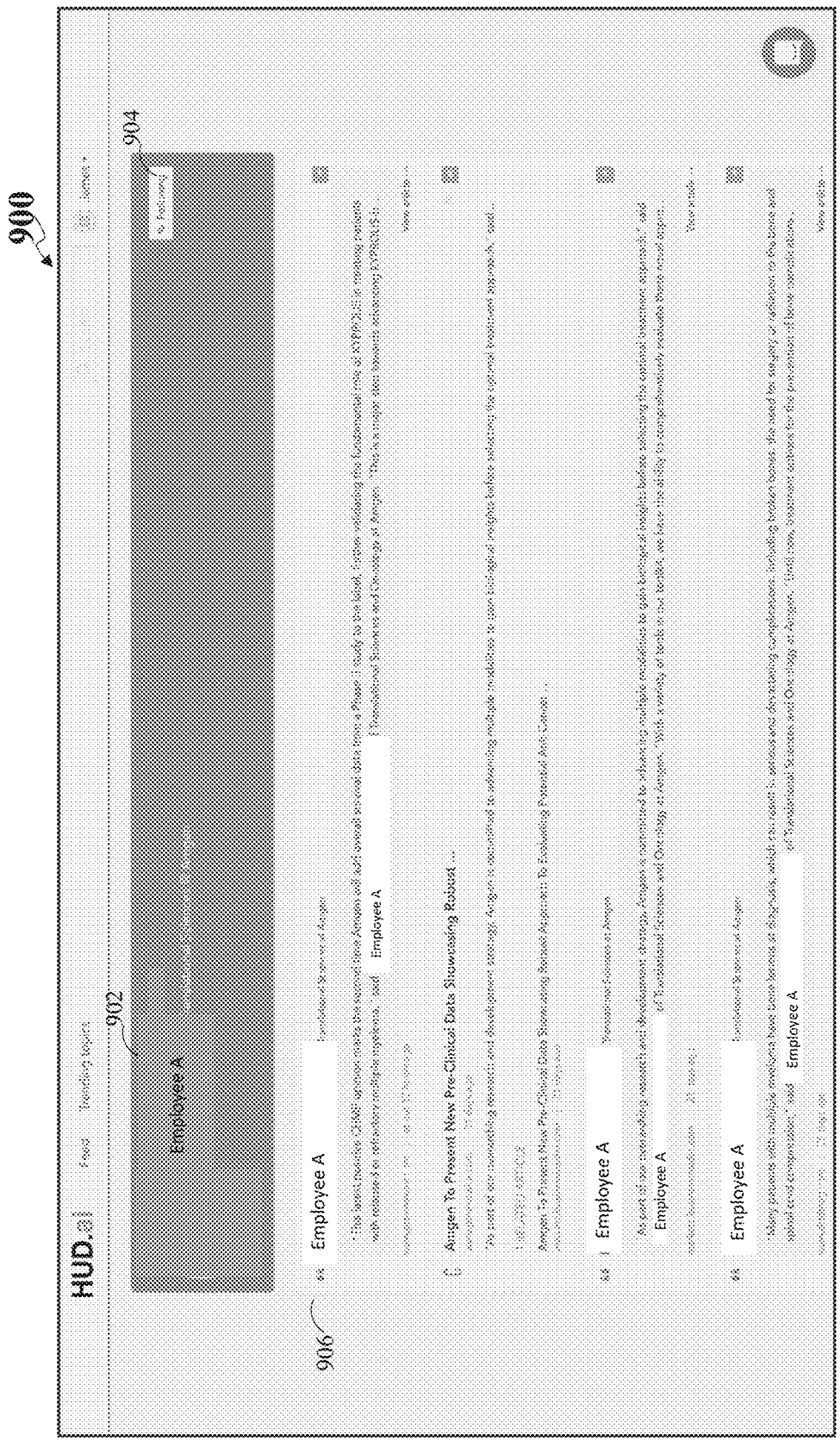
FIG. 9 illustrates an example of a graphical user interface for displaying news items for a key person, according to an embodiment.

FIG. 9 illustrates an example of a graphical user interface 900 for displaying news items for a key person, according to an embodiment. The GUI 900 may include the person's name, photo and title 902. The GUI may include an interactive element (e.g., button) 904 to allow the user to follow the person. The GUI may also include the news items 906 comprising quotes, tweets, reports and any other information relevant to the person.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
executing, by a server, a first artificial intelligence model configured to receive a set of vectors representing a semantic attribute for a set of web documents and to generate an importance value associated with each web document;
executing, by the server, a second artificial intelligence model configured to receive a first subset of the set of web documents satisfying an importance value threshold and to generate a relevance value associated with each web document within the first subset of the set of web documents;
identifying, by the server, a second subset of the set of web documents based upon their corresponding importance values and relevance values; and
presenting, by the server, for display at least an indication of at least one web document within the second subset of the set of web documents.

2. The method of claim 1, wherein the set of web documents corresponds to one or more received or retrieved search attributes.

3. The method of claim 2, wherein the relevance value corresponds to a degree of commonality between the one or more search attributes and at least one web document.

4. The method of claim 1, wherein presenting for display comprises presenting at least a portion of the at least one web document within the second subset of the set of web documents.

5. The method of claim 1, wherein presenting for display comprises presenting a uniform resource locator of at least one web document.

6. The method of claim 1, further comprising:
invoking, by the server, an electronic messaging application and transmitting at least an indication of at least one web document within the second subset of the set of web documents to the electronic messaging application.

7. The method of claim 1, further comprising:
pre-populating, by the server, an electronic message with a predetermined text string associated with at least one web document.

8. The method of claim 1, further comprising:
transmitting, by the server, an alert to a user computing device, the alert associated with at least one web document within the second subset of the set of web documents.

9. The method of claim 1, wherein the set of web documents comprises at least one of new articles, scraped data from one or more web pages, closed captioning from a video, and scraped data from one or more social media platforms.

10. The method of claim 1, further comprising:
executing, by the server, a user-specific artificially intelligent model configured to identify a likelihood of a user designating one or more web documents within the second subset of the set of web documents as unsatisfactory, whereby the user-specific artificially intelligent model is trained based on the one or more web documents designated as unsatisfactory.

11. A computer system comprising:

a user computing device configured to display a graphical user interface maintained by a server; and the server in communication with the user computing device, the server configured to:

execute a first artificial intelligence model configured to receive a set of vectors representing a semantic attribute for a set of web documents and to generate an importance value associated with each web document;

execute a second artificial intelligence model configured to receive a first subset of the set of web documents satisfying an importance value threshold and to generate a relevance value associated with each web document within the first subset of the set of web documents;

identify a second subset of the set of web documents based upon their corresponding importance values and relevance values; and present for display at least an indication of a portion of at least one web document within the second subset of the set of web documents.

12. The system of claim 11, wherein the set of web documents corresponds to one or more received or retrieved search attributes.

13. The system of claim 12, wherein the relevance value corresponds to a degree of commonality between the one or more search attributes and at least one web document.

14. The system of claim 11, wherein presenting for display comprises presenting at least a portion of the at least one web document within the second subset of the set of web documents.

15. The system of claim 11, wherein presenting for display comprises presenting a uniform resource locator of at least one web document.

16. The system of claim 11, wherein the server is further configured to:

invoke an electronic messaging application and transmitting at least an indication of at least one web document within the second subset of the set of web documents to the electronic messaging application.

17. The system of claim 11, wherein the server is further configured to:

pre-populate an electronic message with a predetermined text string associated with at least one web document.

18. The system of claim 11, wherein the server is further configured to:

transmitting, by the server, an alert to a user computing device, the alert associated with at least one web document within the second subset of the set of web documents.

19. The system of claim 1, wherein the set of web documents comprises at least one of new articles, scraped data from one or more web pages, closed captioning from a video, and scraped data from one or more social media platforms.

20. The system of claim 1, wherein the server is further configured to:

execute a user-specific artificially intelligent model configured to identify a likelihood of a user designating one or more web documents within the second subset of the set of web documents as unsatisfactory, whereby the user-specific artificially intelligent model is trained based on the one or more web documents designated as unsatisfactory.

* * * * *